United States Patent
Voelker et al.

(10) Patent No.: US 10,630,720 B2
(45) Date of Patent: Apr. 21, 2020

(54) SECURE NETWORK ACCESS PROTECTION USING AUTHENTICATED TIME MEASUREMENT

(71) Applicant: Bayerische Motoren Werke Aktiengesellschaft, Munich (DE)

(72) Inventors: Lars Voelker, Munich (DE); Max Turner, Munich (DE); Georg Hoiss, Habach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 165 days.

(21) Appl. No.: 15/210,304

(22) Filed: Jul. 14, 2016

(65) Prior Publication Data
US 2016/0323312 A1 Nov. 3, 2016

Related U.S. Application Data

(63) Continuation of application No. PCT/EP2014/077704, filed on Dec. 15, 2014.

(30) Foreign Application Priority Data

Jan. 15, 2014 (DE) .................. 10 2014 200 558

(51) Int. Cl.
*G06F 21/10* (2013.01)
*H04L 29/06* (2006.01)
*H04L 12/40* (2006.01)

(52) U.S. Cl.
CPC .......... *H04L 63/1466* (2013.01); *H04L 63/08* (2013.01); *H04L 63/10* (2013.01); *H04L 63/162* (2013.01); *H04L 2012/40273* (2013.01)

(58) Field of Classification Search
CPC ....................................................... G06F 15/16
See application file for complete search history.

(56) References Cited

U.S. PATENT DOCUMENTS

| 8,359,470 | B1 | 1/2013 | Choi | |
| 10,129,745 | B2 * | 11/2018 | Lv | ................ H04L 63/0884 |
| 2006/0026670 | A1 * | 2/2006 | Potter | .................. G06F 21/31 |
| | | | | 726/7 |
| 2009/0059797 | A1 | 3/2009 | Northcutt et al. | |

(Continued)

FOREIGN PATENT DOCUMENTS

| DE | 10 2010 033 230 A1 | 2/2012 |
| DE | 10 2012 020 900 A1 | 4/2013 |

OTHER PUBLICATIONS

"IEEE Standard for a Precision Clock Synchronization Protocol for Networked Measurement and Control Systems", IEEE Std 1588-2008, Jul. 24, 2008 (289 pages).

(Continued)

*Primary Examiner* — Josnel Jeudy
(74) *Attorney, Agent, or Firm* — Crowell & Moring LLP

(57) ABSTRACT

A method and a corresponding apparatus are provided for securing access to a network, in particular a local area network. The method includes authenticating a supplicant with an authenticator using an authentication protocol. The method determines a transit time of a message between the supplicant and the authenticator. The method controls access to the Ethernet network by the supplicant canton the basis of the authentication which has been carried out and the transit time determined.

9 Claims, 2 Drawing Sheets

(56) References Cited

U.S. PATENT DOCUMENTS

| | | | |
|---|---|---|---|
| 2010/0195636 A1* | 8/2010 | Nakashima | H04L 5/0053 |
| | | | 370/342 |
| 2013/0042301 A1* | 2/2013 | Mahamuni | H04W 12/06 |
| | | | 726/3 |
| 2013/0132541 A1 | 5/2013 | Falk et al. | |
| 2015/0003456 A1* | 1/2015 | Seo | H04L 12/28 |
| | | | 370/392 |
| 2018/0288006 A1* | 10/2018 | Somasandharam | H04L 9/3234 |

OTHER PUBLICATIONS

"Timing and Synchronization for Time-Sensitive Applications in Bridged Local Area Networks", IEEE Std 802.1AS-2011, Mar. 30, 2011 (292 pages).

International Search Report (PCT/ISA/210) issued in PCT Application No. PCT/EP2014/077704 dated Mar. 11, 2015, with English translation (four (4) pages).

German Search Report issued in counterpart German Application No. 10 2014 200 558.2 dated Oct. 30, 2014, with partial English translation (twelve (12) pages).

Menezes et al., "Handbook of Applied Cryptography", 1997, CRC Press LLC, XP055173532, (twenty-two (22) pages).

"Port-Based Network Access Control", IEEE std 802.1X-2010, Feb. 5, 2010, (222 pages).

\* cited by examiner

SECURE NETWORK ACCESS PROTECTION USING AUTHENTICATED TIME MEASUREMENT

CROSS REFERENCE TO RELATED APPLICATIONS

This application is a continuation of PCT International Application No. PCT/EP2014/077704, filed Dec. 15, 2014, which claims priority under 35 U.S.C. § 119 from German Patent Application No. 10 2014 200 558.2, filed Jan. 15, 2014, the entire disclosures of which are herein expressly incorporated by reference.

BACKGROUND AND SUMMARY OF THE INVENTION

The invention relates to a method and a corresponding apparatus for securing access to a network, particularly to a local area network (LAN).

Vehicles (e.g. automobiles, trucks and/or motorcycles) typically have a communication system using one or more bus systems for exchanging information between different controllers of a vehicle. The one or more bus systems may particularly comprise an Ethernet network. An Ethernet network can be used by controllers of the vehicle (e.g. cameras) to exchange relatively large volumes of data.

One or more of the controllers connected to an Ethernet network of the vehicle (also referred to as Ethernet controllers) may be arranged in the vehicle such that they are relatively simple for an attacker, such as a hacker, to access. These controllers could be used by an unauthorized party to gain access to the communication system of the vehicle (e.g. by replacing a controller or by introducing an intermediate computer for a so-called man-in-the-middle attack).

In order to prevent this, authentication according to the IEEE 802.1X standard can be effected in the Ethernet network of the vehicle. However, it has been found that even authentication according to the IEEE 802.1X standard cannot completely rule out man-in-the-middle attacks.

Therefore, the present document is concerned with the technical problem of securing access to an Ethernet network of a vehicle such that access by unauthorized parties (including by means of a man-in-the-middle attack) can be avoided in a cost-efficient manner.

According to one aspect, a method for controlling access by a supplicant to an Ethernet network via an authenticator is described. The Ethernet network can be part of a communication system of a vehicle. In this case, the supplicant and/or the authenticator may each be a controller of the vehicle. The authenticator can be an Ethernet switch for controlling access to the Ethernet network.

The method comprises authentication of the supplicant with the authenticator using an authentication protocol. The authentication protocol can include Ethernet port based access control according to the IEEE 802.1X standard. Furthermore, the authentication of the supplicant can include the sending of an Extensible Authentication Protocol (EAP) message.

The method further comprises determination of a delay in a message between the supplicant and the authenticator. For this purpose, the method can include synchronization of a time of the supplicant and a time of the authenticator, using a time synchronization protocol. Examples of the time synchronization protocol are the IEEE 802.AS standard and/or the Precision Time Protocol (PTP). Synchronization of the times of the supplicant and the authenticator can ensure that the delay in the message can be determined in a precise manner.

Furthermore, the determination of the delay in a message can include assignment of a random identifier to the message for which the delay is ascertained. As such, it is possible to ensure that the message can be identified unequivocally by the supplicant and/or by the authenticator, and hence the delay in the message can be determined in a reliable manner.

The method further comprises control of access by the supplicant to the Ethernet network on the basis of the effected authentication and the ascertained delay. By taking account of the delay in a message for access control, man-in-the-middle attacks can be reliably ruled out, since such attacks typically result in a significant extension to the delay of messages.

A line between supplicant and authenticator can have a length that is equal to or less than a predefined length threshold value. This is the case particularly in vehicles in which the length of connecting lines between two controllers (i.e. between the supplicant and the authenticator) are typically prescribed by the dimensions of the vehicle. The control of access can then include checking whether the determined delay is equal to or less than a predefined delay threshold value. It is therefore possible to determine, in a simple and cost-efficient manner, whether there is a man-in-the-middle attack, in the case of which the delay in a message interchanged between the supplicant and the authenticator would be above the predefined delay threshold value.

The predefined delay threshold value can be determined by computer, e.g. on the basis of a known length of the connecting line between supplicant and authenticator. Alternatively or additionally, the predefined delay threshold value can be determined experimentally (e.g. in a secure environment prior to delivery of a vehicle).

The Ethernet network can comprise a full duplex connecting line between supplicant and authenticator. In other words, a message between supplicant and authenticator can be interchanged via a full duplex Ethernet bus. The use of a full duplex connecting line is advantageous because, in such a case, performance of a man-in-the-middle attack requires the introduction of an intermediate computer and/or physical breakage of the connecting line. These steps significantly increase the delay in messages between supplicant and authenticator. Consequently, the use of full duplex connecting lines facilitates detection of a man-in-the-middle attack on the basis of the delay in a message.

According to a further aspect, a controller for a vehicle is described. The controller can have the function of a supplicant that asks for or requests access to an Ethernet network of the vehicles. The controller is set up to authenticate itself with an authenticator of the Ethernet network of the vehicle, using an authentication protocol. Furthermore, the controller may be set up to determine a delay in a message between the controller and the authenticator. For this purpose, the controller may be set up to send a message with a random identifier to the authenticator. Furthermore, the controller is set up to take the effected authentication and to take the determined delay as a basis for gaining access to the Ethernet network.

According to a further aspect, a component for an Ethernet network of a vehicle is described. The component can include e.g. a controller of the vehicle. The component can have the function of an authenticator for the Ethernet network. For this purpose, the component can be an Ethernet switch.

The component is set up to authenticate a supplicant that requests access to the Ethernet network, using an authentication protocol. Additionally, the component is set up to determine a delay in a message between the supplicant and the component. Furthermore, the component is set up to control access by the supplicant to the Ethernet network on the basis of the effected authentication and on the basis of the determined delay.

According to a further aspect, a vehicle (e.g. an automobile, a truck or a motorcycle) is described that includes a controller, described herein, and/or a component of an Ethernet network, which component is described herein.

According to a further aspect, a software (SW) program is described. The SW program can be set up to be executed on a processor (e.g. on a controller) and thereby to perform the method described herein.

According to a further aspect, a storage medium is described. The storage medium can include an SW program that is set up to be executed on a processor and thereby to perform the method described herein.

It should be noted that the methods, apparatuses and systems described in this document can be used either on their own or in combination with other methods, apparatuses and systems described in this document. Furthermore, any aspects of the methods, apparatuses and systems described in this document can be combined with one another in a variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

As stated at the outset, the present document is concerned with the technical problem of authenticating access by a controller to an Ethernet network in a vehicle in a cost efficient manner.

Figure 1:
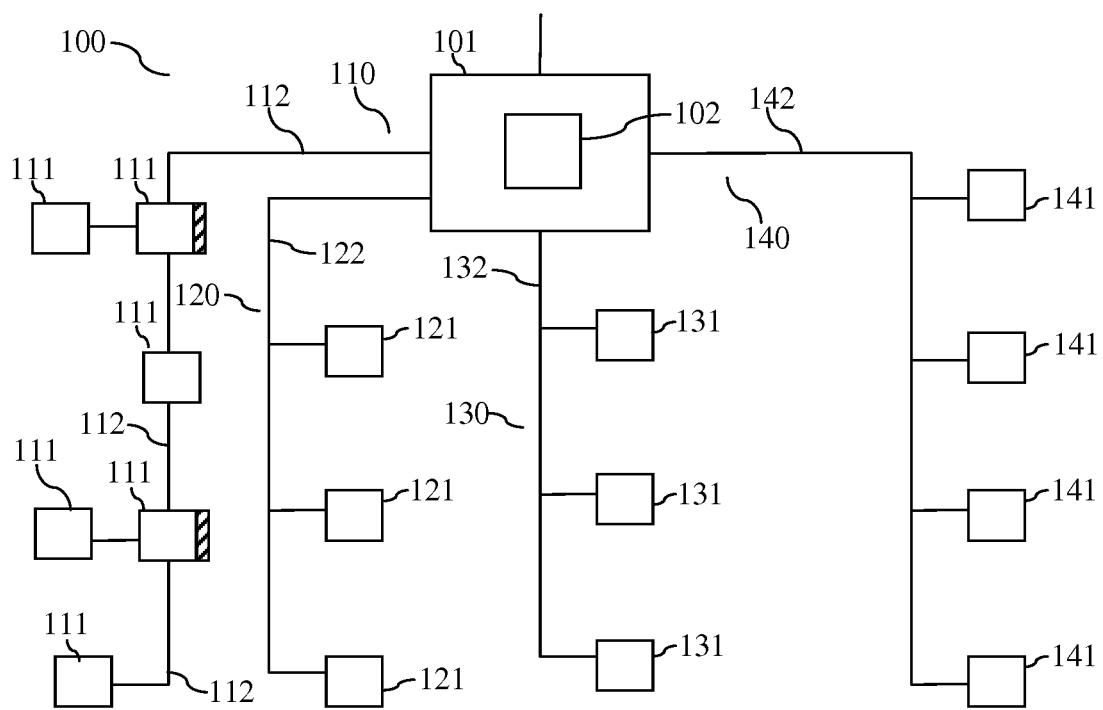
FIG. 1 is a block diagram of an exemplary communication system of a vehicle.

FIG. 1 shows an exemplary communication system 100 for a vehicle (e.g. for a motor vehicle or automobile). The system 100 includes a central gateway (ZGW) or a central controller (ZSG) 101 to which different bus systems 120, 130, 140 are connected. The bus system 120 is, e.g., a synchronous FlexRay bus system. The bus system 130 is, e.g., an asynchronous CAN (controller area network) bus system. And, the bus system 140 is, e.g., a synchronous MOST (media orientated systems transport) bus system. The respective bus systems have various components of the vehicle (such as e.g. sensors, actuators and/or controllers (electronic control units, ECU)) connected to them. As such, the bus 122 of the bus system 120 has the components 121 connected to it, the bus 132 of the bus system 130 has the components 131 connected to it and the bus 142 of the bus system 140 has the components 141 connected to it.

The components (e.g. the individual controllers, SG, of the vehicle) can pass data to the bus as a transmitter and receive data from the bus as a receiver, according to the protocol of the respective bus system. As FIG. 1 shows, in the case of the FlexRay bus system 120, the CAN bus system 130 and the MOST bus system 140, a respective common bus 122, 132, 142 is used in this instance, the transmission capacity of which must be shared by all components 121, 131, 141 that are connected to the bus 122, 132, 142. This has the disadvantage that the transmission capacity available to each individual component 121, 131, 141 is reduced as the number of components 121, 131, 141 increases.

The gateway 101 also has an Ethernet network 110 connected to it. The Ethernet network 110 likewise includes a plurality of components or controllers 111 that are connected to one another via buses 112. In the case of the Ethernet network 110, some or all of the components 111 generally include switches (represented by shaded boxes) that allow data to be steered in a specific manner from a sending component 111 to a receiving component 111', so that these data are generally not transmitted on all buses 112 but rather only on buses 112 that are situated on the transmission path between the sending component 111 and the receiving component 111'. The use of switches results in an increase in the transmission capacity available to each individual component 111.

The use of an Ethernet network 110 therefore has advantages in terms of the transmission capacity available to the individual controllers 111. This is significant particularly for sensors 111 such as cameras, which produce a relatively large volume of data to be transmitted. On the other hand, in the case of Ethernet networks 110, the technical problem arises of ensuring that the individual components 111 of the Ethernet network 110 have access authorization for the Ethernet network 110. By way of example, externally accessible components 111 of the vehicle could be replaced by unauthorized components 111, which could present a security risk for the vehicle.

Figure 2:
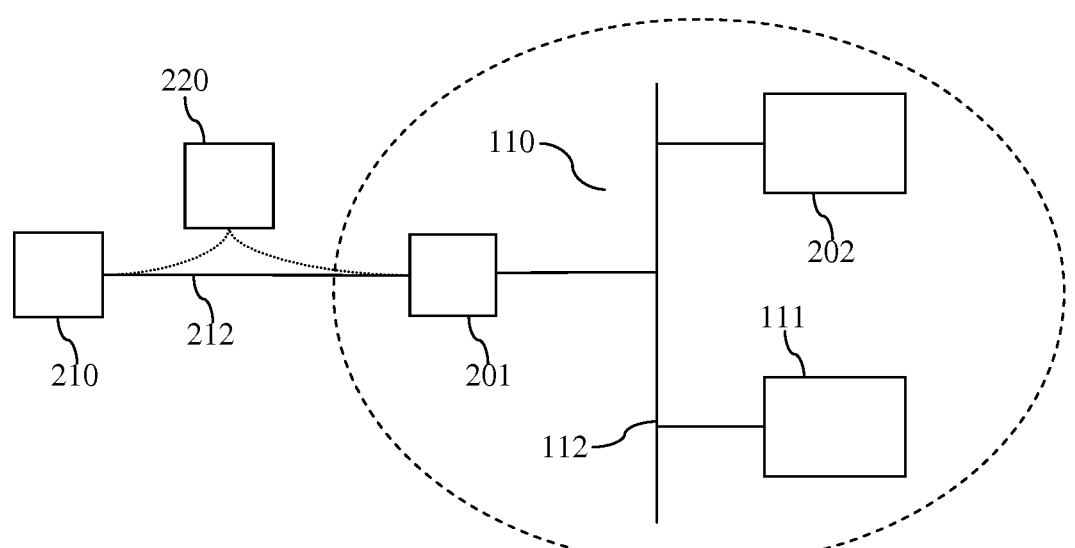
FIG. 2 is a block diagram of exemplary components for authentication in an Ethernet network.

In this context, the IEEE 802.1X standard has been specified, which allows authentication and authorization of components 111 in an Ethernet network 110 (i.e. in an IEEE 802 network). FIG. 2 shows the role distribution for an authentication according to IEEE 802.1X by way of example. What is known as a supplicant 210 makes a request for network access to an authenticator 201. The authenticator 201 may be implemented e.g. in a port of an Ethernet switch of a component 111 of the Ethernet network 110 of the vehicle. The authenticator 201 uses an authentication server 202 (e.g. uses a RADIUS server) to check the authentication information transmitted by the supplicant 210 and, if appropriate, grants access to the network 110 that is accessible via the authenticator 201.

For authentication purposes, the IEEE 802.1X standard recommends the Extensible Authentication Protocol (EAP) or the PPP (Point to Point Protocol)-EAP TLS (Transport Layer Security) authentication protocol. Alternatively or additionally, it is e.g. also possible for EAP TTLS, EAP CHAP, EAP PAP or other protocols to be used. These protocols are unsafe vis-à-vis man-in-the-middle attackers, however. In particular, a man-in-the-middle attack is possible because according to IEEE 802.1X, only the start of a connection is secured. Following the authentication, potential attackers are able to misuse the opened connection for other purposes if the attacker succeeds in physically channeling into the connection. To this end, it is possible to use, e.g., a computer 220 connected between an authenticated controller 210 and a secure port of the authenticator 201 (also called an intermediate computer) (see FIG. 2).

In this context, the IEEE 802.1X standard allows encryption and/or authentication of a link (e.g. by means of LinkSec) and would thus not be able to be subjected to a man-in-the-middle attack. However, the use of encryption requires additional hardware and/or software resources for continuous encryption and/or authentication of the communication between the supplicant 210 and the authenticator 201. Alternatively or additionally, IPsec, TLS and/or other protocols could be used in order to encrypt and authenticate the communication. As a result, the port on the authenticator 201 would not be able to be subjected to a man-in-the-middle attack. These protocols generally cannot be used for multicast and broadcast communication, however, and therefore can be used only to a limited extent in vehicles.

The present document describes a method that allows a controller (supplicant) 210 to authenticate itself with an Ethernet switch (authenticator) 201 and in so doing to ensure that a man-in-the-middle attacker is not present. The method described can be used particularly in full duplex Ethernet networks (such as e.g. a BroadR-Reach Ethernet network). The use of a full duplex Ethernet network is advantageous because the use of a common physical line (e.g. a common two wire line) allows the costs and weight of the bus 112 of the Ethernet network 110 to be reduced. Furthermore, the method described is resource efficient and hence cost efficient, since particularly no encryption of the connection is required in order to ensure that a man-in-the-middle attack is not possible.

Vehicles have the special feature that the individual controllers/components 210, 201, 111 of the Ethernet network 110 are at a predefined and/or fixed distance from one another. In particular, the supplicant 210 (e.g. the controller of a vehicle camera) in a vehicle is typically connected to the authenticator 201 via a line 212 having a fixed length. As a result, messages that are interchanged between the supplicant 210 and the authenticator 201 have a fixed delay. In particular, messages that are interchanged between the supplicant 210 and the authenticator 201 have a delay that is below a predefined delay threshold value.

In order to check for a man-in-the-middle attack, the delay in a message interchanged between the supplicant 210 and the authenticator 201 can therefore be checked. If there is a man-in-the-middle attack, then a message is typically channeled via an intermediate computer 220 and possibly modified. This extends the delay in the message. In particular, this results in the actual delay in the message being above the predefined delay threshold value. The increased delay can be detected by the authenticator 201, and access by the supplicant 210 to the Ethernet network 110 of the vehicle can then be prevented.

In order to determine the delay ("path delay") in a message, the IEEE 802.1AS standard or the Precision Time Protocol (PTP) or another protocol for interchanging time information can be used. Such protocols allow delays to be determined with an accuracy of approximately 1-10 ns. To measure the delay, a transmitted message can be assigned a univocal random ID that is transported e.g. by means of a header extension (e.g. TLV (type length value) in IEEE 802.1AS) or in a header field that is already present in the message.

In the case of PTP, it is possible, e.g., for the authenticator 201 to send its time in a message to the supplicant 210, with the supplicant 210 determining the time of reception of the message on the basis of its time. In addition, the supplicant 210 can send a Delay Request Message to the authenticator 201, with the time of reception of the Delay Request Message at the authenticator 201 in turn being returned as Delay Response Message to the supplicant 210. The respective differences in the time markers can be used to determine the delay in a message between supplicant 210 and authenticator 201 (even if there is an offset between the clock times of the supplicant 210 and the authenticator 201).

The delay threshold value can be determined and stipulated in advance. In particular, the delay threshold value can be determined and stipulated in a secure environment (e.g. prior to delivery of the vehicle). This ensures that setting excessively high delay threshold values suspends the delay check.

Figure 3:
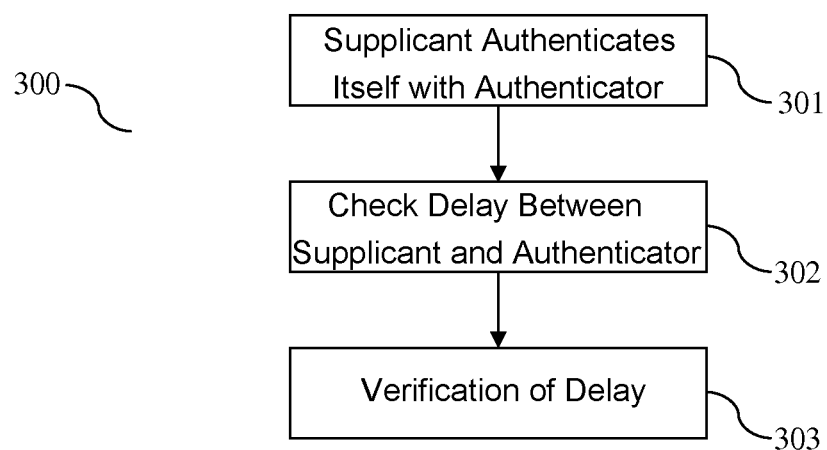
FIG. 3 is a flowchart for an exemplary method for authenticating a controller.

FIG. 3 shows a flowchart for an exemplary method 300 for authenticating a supplicant 210 with an authenticator 201. In a first step 301, the supplicant 210 (e.g. a vehicle controller) authenticates itself with an authenticator 201 (e.g. a switch controller of the vehicle). This can be accomplished by using the IEEE 802.1X standard, e.g. using EAP. The EAP module used can perform an authentication on the basis of certificates, asymmetric keys, symmetric keys or the like.

The method 300 further includes the checking 302 of the delay (e.g. of the path delay) between supplicant 210 and authenticator 201. This can be accomplished by using the aforementioned protocols. In particular, it can involve the use of a path delay measurement by means of challenge/response, signatures or similar methods. The delay can be determined by way of a single path delay message or on the basis of multiple messages. To check the delay, the determined delay can be compared with the predefined delay threshold value. If the determined delay is above the predefined delay threshold value, then this can result in failure of the authentication of the supplicant 210 with the authenticator 201.

The method 300 further includes the verification 303 of whether both the EAP authentication (in step 301) and the authentication of the path delay messages were successful (in step 302), and whether the measured delay is below the configured and/or taught delay threshold value. If this is the case, then the supplicant 210 can be cleared. Otherwise, the supplicant 210 can be rejected.

In particular, both the supplicant 210 and the authenticator 201 (i.e. both controllers) can check whether the EAP authentication and the authentication of the path delay messages were successful, and whether the measured delay is below the configured and/or taught delay threshold value.

The method for clearing a controller that is described in this document allows security for vulnerable controllers to be increased at simultaneously moderate cost. In particular, controllers in a vehicle today are already frequently equipped with time recording units that allow precise determination of the delays without additional costs. By determining the delay, it is possible, particularly on a full duplex Ethernet network, for a man-in-the-middle attack to be reliably identified and hence ruled out.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling access by a supplicant to an Ethernet network via an authenticator, the method comprising the acts of:
   authenticating the supplicant with the authenticator using an authentication protocol;
   determining a delay in a message between the supplicant and the authenticator, the delay being a time period between the supplicant sending the message and the authenticator receiving the message; and controlling access by the supplicant to the Ethernet network on the basis of the effected authentication and the determined delay.

2. The method according to claim 1, wherein:

a line between the supplicant and the authenticator has a length that is equal to or less than a predefined length threshold value; and controlling access comprises checking whether the delay is equal to or less than a predefined delay threshold value.

3. The method according to claim 1, wherein the authentication of the supplicant comprises sending of an Extensible Authentication Protocol (EAP) message.

4. The method according to claim 1, wherein the method further comprises the act of synchronizing a time of the supplicant and a time of the authenticator, using a time synchronization protocol.

5. The method according to claim 1, wherein the time synchronization protocol comprises IEEE 802.AS and/or Precision Time Protocol, (PTP).

6. The method according to claim 1, wherein the determining of the delay in a message comprises assignment of a random identifier to the message for which the delay is determined.

7. The method according to claim 1, wherein the Ethernet network comprises a full duplex connecting line between the supplicant and the authenticator.

8. The method according to claim 7, wherein the Ethernet network is part of a communication system of a vehicle.

9. The method according to claim 1, wherein the Ethernet network is part of a communication system of a vehicle.

* * * * *